US005396764A

United States Patent [19]

Rao et al.

[11] Patent Number: 5,396,764

[45] Date of Patent: Mar. 14, 1995

[54] SPARK IGNITION ENGINE EXHAUST SYSTEM

[75] Inventors: Vemulapalli D. N. Rao, Bloomfield Township, Oakland Co.; Harry A. Cikanek, Northville, both of Mich.

[73] Assignee: Ford Motor Company, Dearborn, Mich.

[21] Appl. No.: 195,502

[22] Filed: Feb. 14, 1994

[51] Int. Cl.[6] .......... F01N 3/20

[52] U.S. Cl. .......... 60/274; 60/287; 60/297; 60/300; 60/311

[58] Field of Search .......... 60/273, 274, 284, 286, 60/287, 297, 299, 300, 302, 303, 311

[56] References Cited

U.S. PATENT DOCUMENTS

| | | | |
|---|---|---|---|
| 3,499,269 | 3/1970 | Bois | 60/311 |
| 3,755,534 | 8/1973 | Graham | 60/299 |
| 3,920,404 | 11/1975 | Gandhi et al. . | |
| 4,515,758 | 5/1985 | Domesle et al. . | |
| 4,519,820 | 5/1985 | Oyobe et al. . | |
| 4,669,261 | 6/1987 | Worner et al. . | |
| 5,089,237 | 2/1992 | Schuster et al. . | |
| 5,138,836 | 8/1992 | Pfister . | |

*Primary Examiner*—Ira S. Lazarus
*Assistant Examiner*—Daniel J. O'Connor
*Attorney, Agent, or Firm*—Joseph W. Malleck; Roger L. May

[57] ABSTRACT

An exhaust system for a spark ignition engine on an automotive vehicle including an exhaust filter disposed downstream of a spark ignition engine for condensing hydrocarbons in exhaust gases from the engine during a first time period after start of the engine, a bypass structure for bypassing at least a portion of exhaust gases around the exhaust-filter to heat the exhaust filter during a second time period after the first time period and evaporate the condensed hydrocarbons, and a catalytic converter disposed downstream of the exhaust filter to oxidize the evaporated hydrocarbons and reduce $NO_x$ in exhaust gases passing therethrough. A method is also provided.

20 Claims, 6 Drawing Sheets

FIG 2
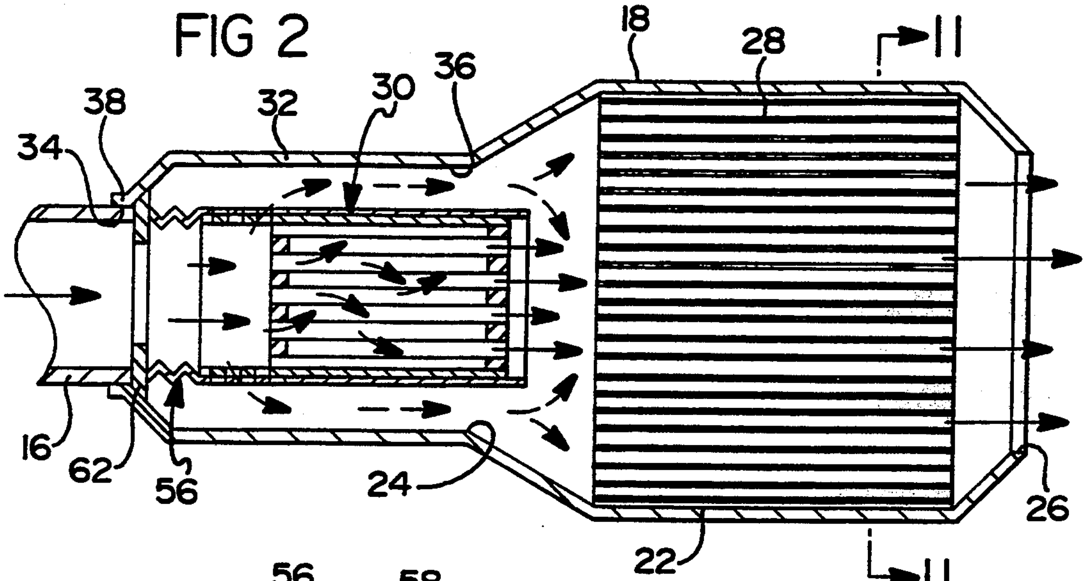
FIG 4
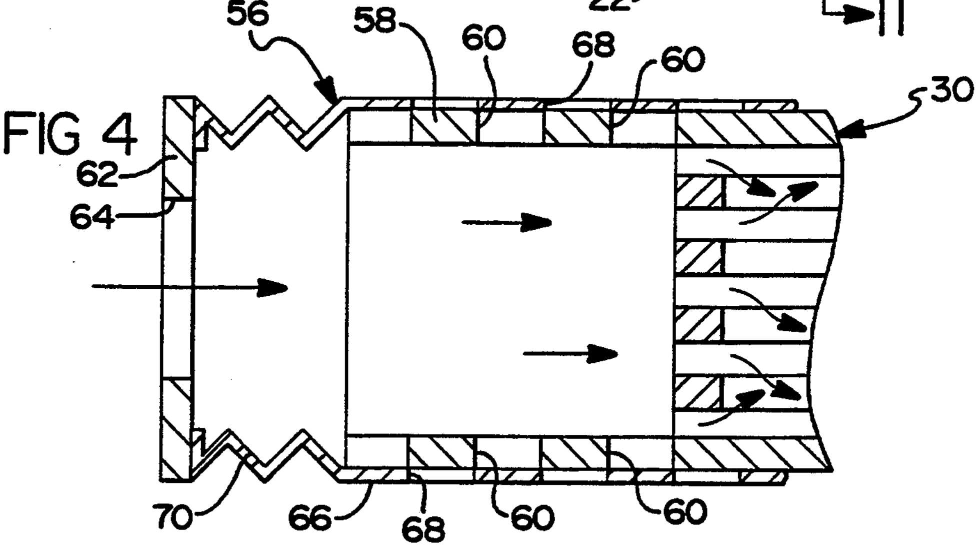
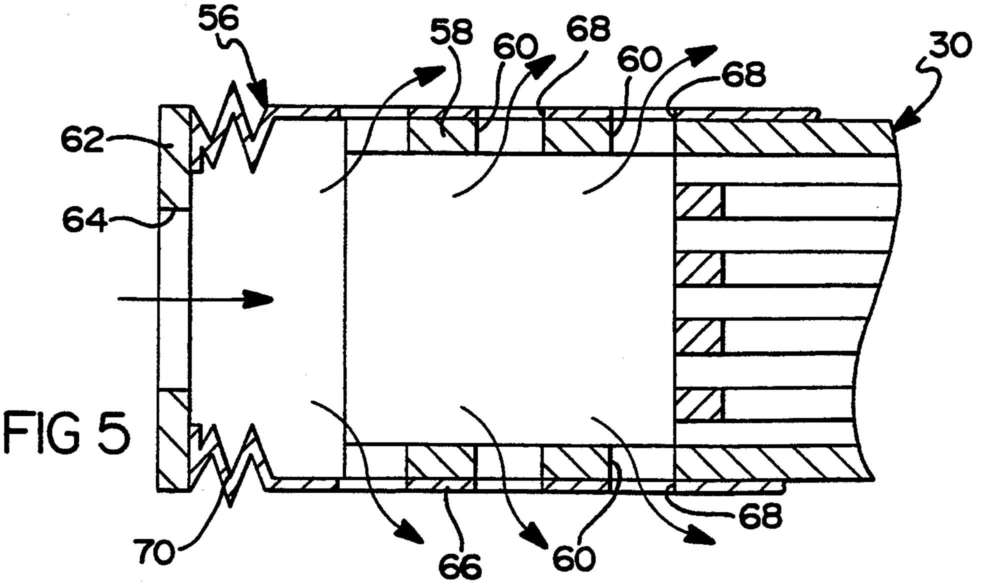
FIG 5

FIG 6
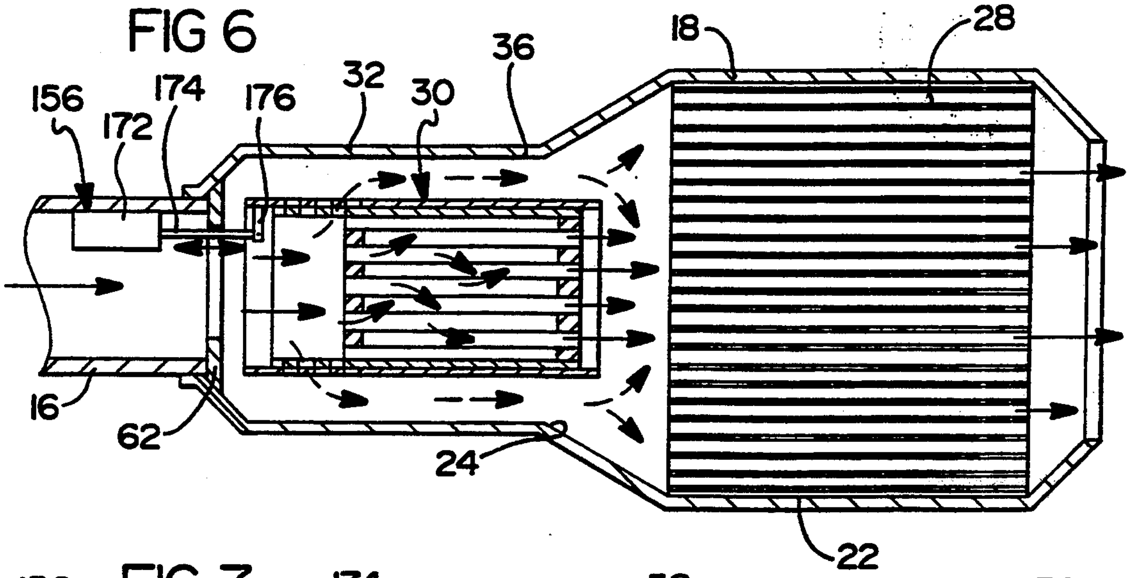
FIG 7
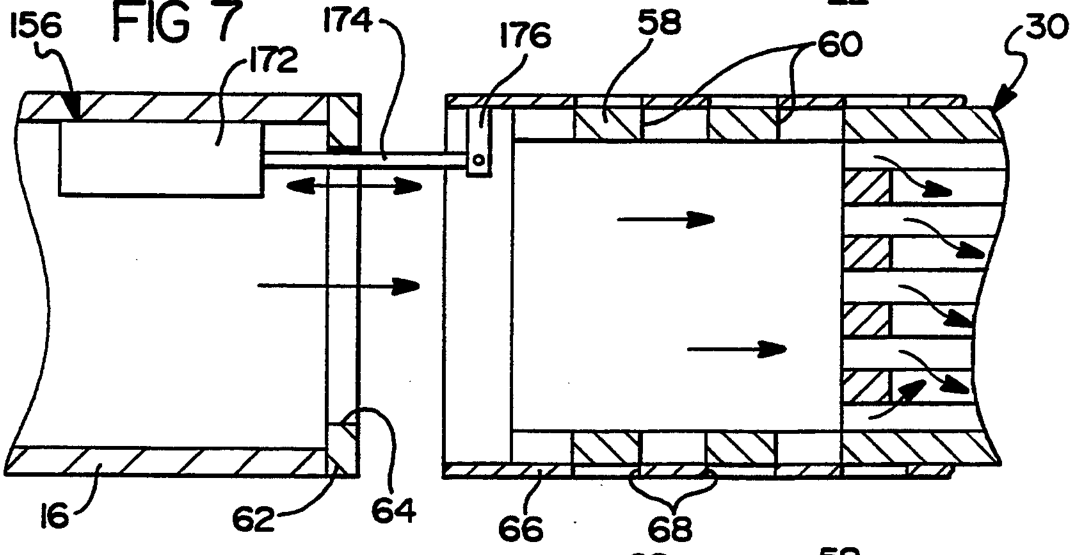
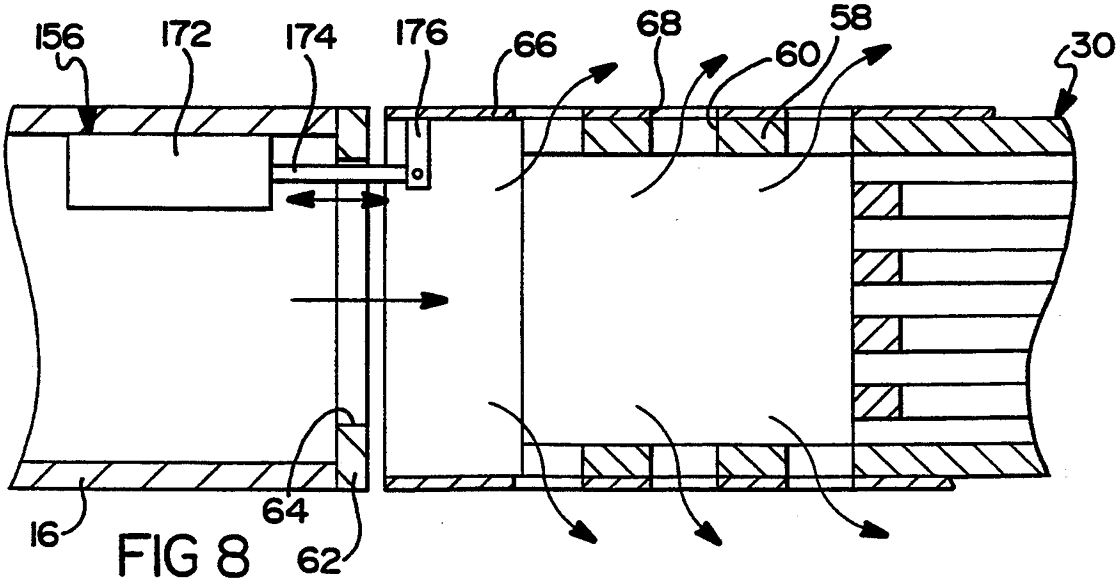
FIG 8

FIG 9
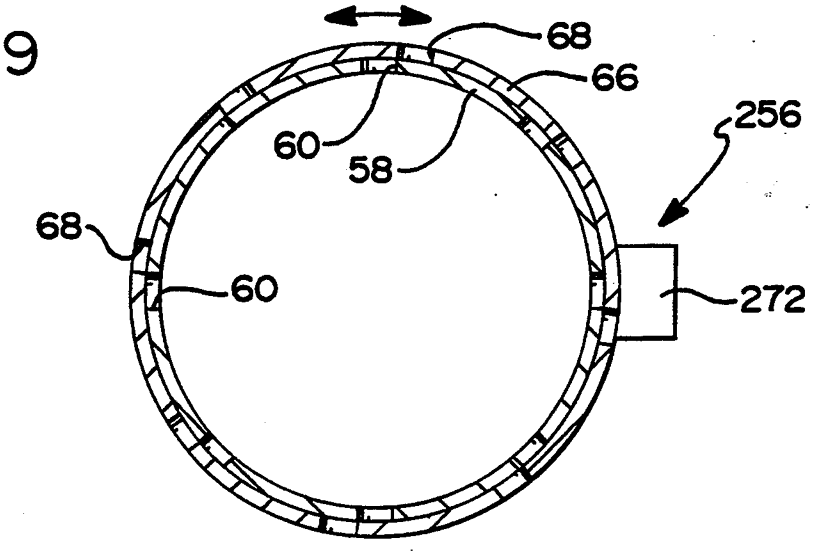
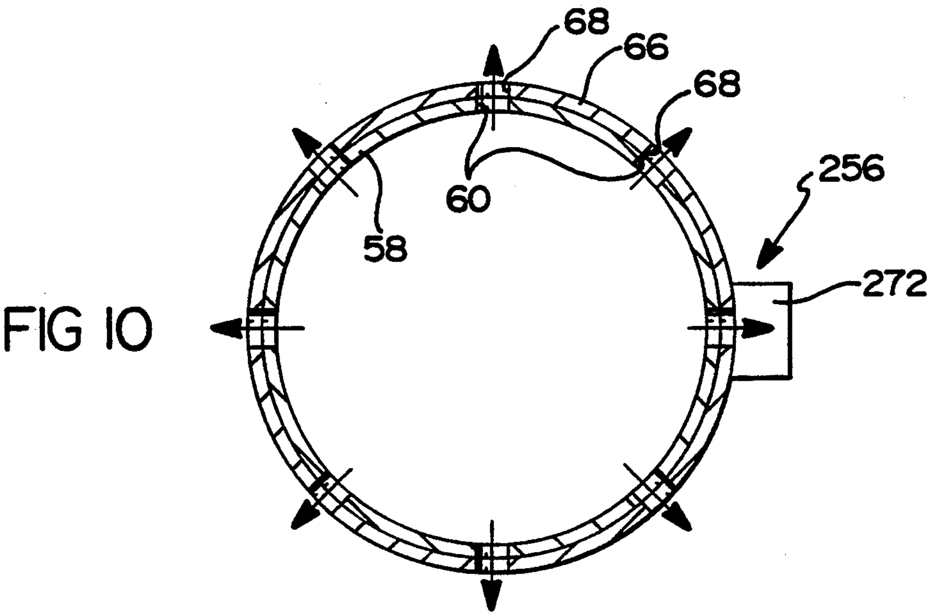
FIG 10
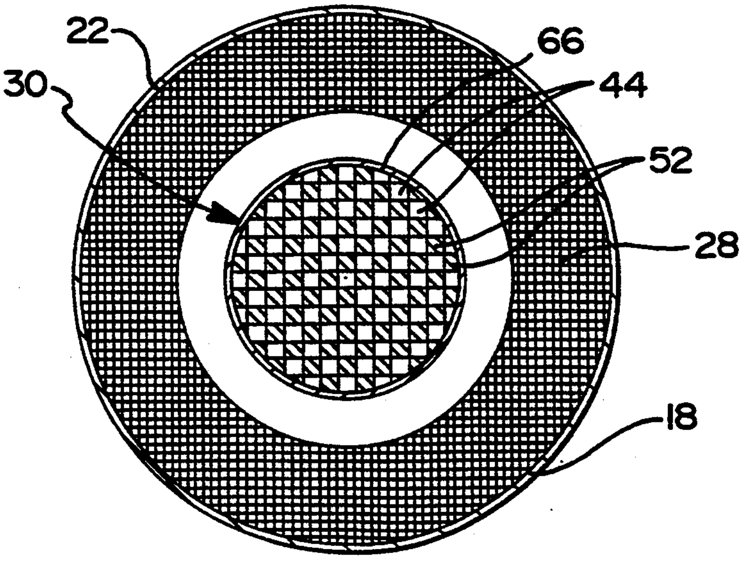
FIG 11

FIG 13
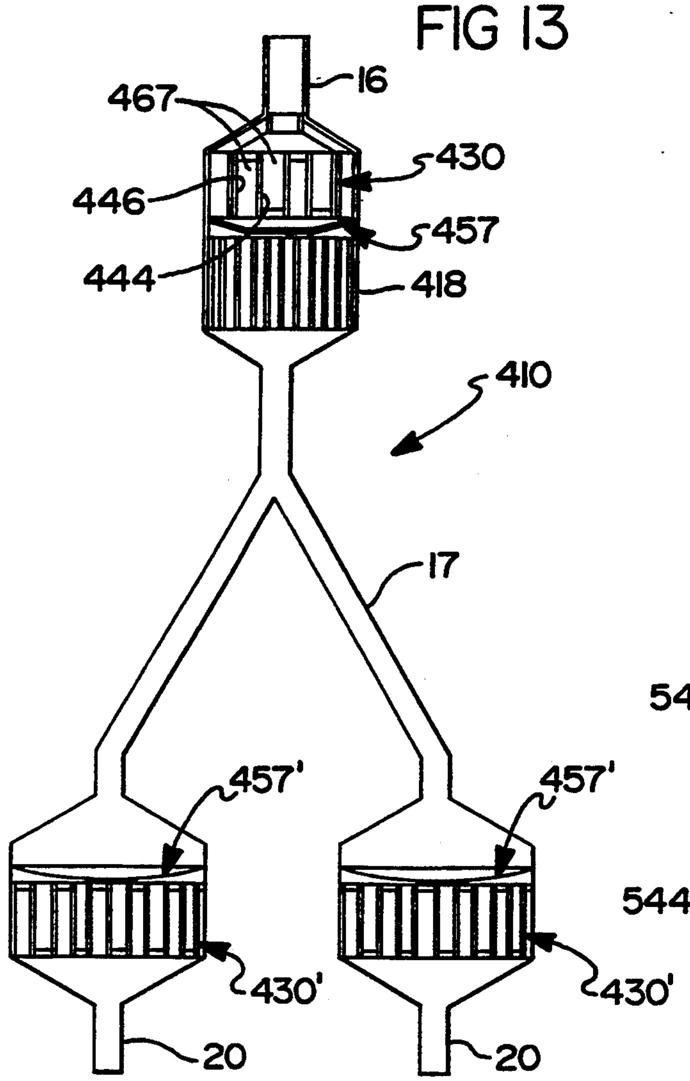
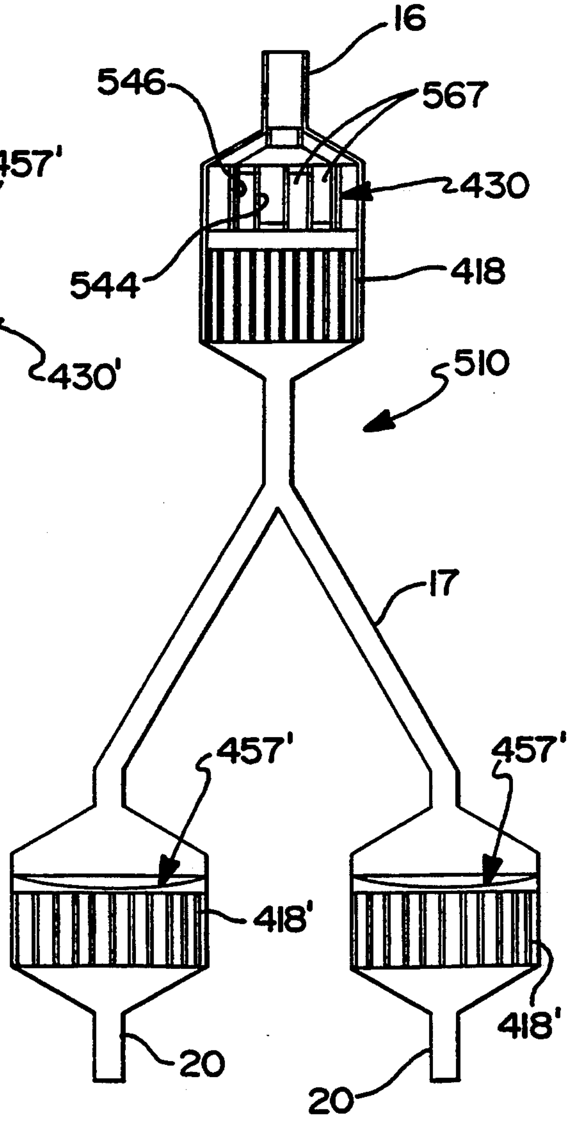
FIG 14

SPARK IGNITION ENGINE EXHAUST SYSTEM

BACKGROUND OF THE INVENTION

1. Field of the Invention.

The present invention relates generally to exhaust systems for vehicles and, more particularly, to an exhaust system for a spark ignition engine of an automotive vehicle.

2. Description of the Related Art

It is known to provide spark ignition internal combustion engines for automotive vehicles. It is also known to provide exhaust systems for the spark ignition internal combustion engines. Commonly, the engine has exhaust manifolds to direct the exhaust gases to the exhaust system. Typically, the exhaust system includes exhaust intake pipes connected to the exhaust manifolds and a catalytic converter connected to the exhaust intake pipes. In the exhaust system, the exhaust gases flow through the exhaust intake pipes and into the catalytic converter. The catalytic converter has a catalyst substrate for converting potentially environmentally harmful exhaust gases passing therethrough into harmless by-products. To effectively and efficiently convert these exhaust gases to the harmless by-products, the temperature of the catalytic converter must be high enough to obtain a high rate of conversion. This is especially true when the engine is first started because the exhaust system is cold.

During cold start of the spark ignition internal combustion engine, fuel comes in contact with the cold combustion chamber and cylinder walls of the engine and does not combust or only partially combusts. In present exhaust systems, this heavy unburned fuel passes through the catalyst substrate unoxidized since the catalyst substrate has not been heated sufficiently (at least to 500° F.) to ignite the hydrocarbon (HC). The amount of HC is significant, generally on the order of 1500 to 3000 parts per million (ppm) and counts heavily against the first bag count in federal test procedures. Although HC burners, electric heaters and by-pass traps have been used to warm up and activate the catalyst substrate prior to cold start or for trapping cold start HCs, they suffer from the disadvantages of adding a relatively high cost and complexity to the exhaust system.

Additionally during cold start, the exhaust gases that pass through the catalyst substrate have an air to fuel (A/F) ratio below stiochemetic (14.7). This results in a relatively high $NO_x$ output for the exhaust system. Although a lean $NO_x$ catalyst may be used on the catalyst substrate to reduce $NO_x$, it suffers from the disadvantage that under ordinary conditions, the exhaust gas temperature is too high for this type of catalyst to yield adequate durability.

SUMMARY OF THE INVENTION

Accordingly, the present invention is an exhaust system for a spark ignition engine on an automotive vehicle including filter means disposed downstream of a spark ignition engine for condensing hydrocarbons in exhaust gases from the engine during a first time period after start of the engine, bypass means for bypassing at least a portion of exhaust gases around the filter means during a second time period after the first time period and evaporate the condensed hydrocarbons, and a catalytic converter disposed downstream of the filter means to oxidize the evaporated hydrocarbons and reduce $NO_x$ in exhaust gases passing therethrough.

Additionally, the present invention is a method of reducing hydrocarbons and $NO_x$ in an exhaust system for a spark ignition engine of an automotive vehicle. The method includes the steps of providing a filter downstream of a spark ignition engine and a catalytic converter downstream of the filter for an exhaust system. The method also includes the steps of condensing hydrocarbons in exhaust gases from the engine on the filter during a first time period after start of the engine, bypassing at least a portion of exhaust gases around the filter to heat the filter during a second time period after the first time period and evaporate the condensed hydrocarbons, and oxidizing the evaporated hydrocarbons and reducing $NO_x$ in exhaust gases passing through the catalytic converter.

One feature of the present invention is that an exhaust system is provided for a spark ignition engine of an automotive vehicle. Another feature of the present invention is that the exhaust system has a ceramic exhaust filter that adsorbs or traps heavy HCs during cold start of the spark ignition engine. Yet another feature of the present invention is that the exhaust filter provides alternate channels that are blocked, forcing 100% of the exhaust gases to go through and be filtered by the walls of the exhaust filter. Still another feature of the present invention is that the exhaust filter holds the trapped HCs until the engine warms up and releases them as the exhaust filter becomes hotter. The heat necessary to release the HCs is sufficient to activate the catalyst substrate and oxidize about 60 to 85 percent of the HCs. A further feature of the present invention is that the exhaust filter burns or oxidizes 90 to 99% of the trapped HCs, providing an effective, low cost means of meeting ultra low emission requirements. Yet a further feature of the present invention is that during a by-pass mode, the evaporated HCs pass through the walls of the exhaust filter and provide a very rich A/F ratio which is conducive to $NO_x$ reduction. Still a further feature of the present invention is that combustion noise is absorbed by the exhaust filter and silenced, thereby eliminating the need for a muffler and resonator on the exhaust system.

Other features and advantages of the present invention will be readily appreciated as the same becomes better understood after reading the subsequent description taken in conjunction with the accompanying drawings.

BRIEF DESCRIPTION OF THE DRAWINGS

FIG. 2 is a fragmentary view of the exhaust system of FIG. 1.

FIG. 4 is an enlarged view of another portion of the exhaust filter of FIG. 2 illustrating a first operational state.

FIG. 5 is a view similar to FIG. 2 illustrating a second operational state.

FIG. 6 is a fragmentary view of a first alternate embodiment, according to the present invention, of the exhaust system of FIG. 1.

FIG. 7 is an enlarged view of a portion of the exhaust system of FIG. 6 illustrating a first operational state.

FIG. 8 is a view similar to FIG. 7 illustrating a second operational state.

FIG. 9 is a fragmentary view of an alternate embodiment of the portion of FIGS. 7 and 8 illustrating a first operational state.

FIG. 10 is a view similar to FIG. 9 illustrating a second operational state.

FIG. 11 is a sectional view taken along line 11—11 of FIG. 2.

FIG. 13 is a fragmentary view of a third alternate embodiment, according to the present invention, of the exhaust system of FIG. 1.

FIG. 14 is a fragmentary view of a fourth alternate embodiment, according to the present invention, of the exhaust system of FIG. 1.

DESCRIPTION OF THE PREFERRED EMBODIMENT(S)

Figure 1A:
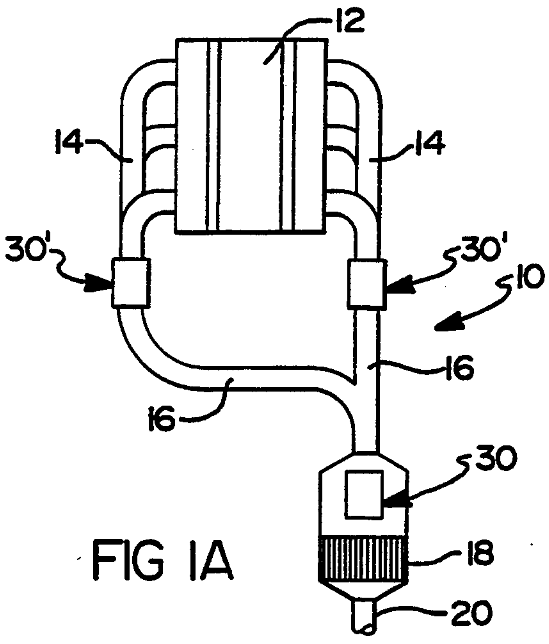
FIG. 1A is a plan view of an exhaust system, according to the present invention, illustrated in operational relationship with a spark ignition internal combustion engine.

Turning now to the drawings and in particular to FIG. 1, an exhaust system 10, according to the present invention, is illustrated in operational relationship with a spark ignition internal combustion engine 12 for a vehicle such as an automotive vehicle (not shown). The engine 12 has exhaust manifolds 14 to direct the exhaust gases from the engine 12 to the exhaust system 10. The exhaust system 10 includes exhaust intake pipes 16 connected to the exhaust manifolds 14 and a catalytic converter 18 connected to the exhaust intake pipes 16. The other end of the catalytic converter 18 is connected to an exhaust pipe 20 which may have a muffler (not shown). It should be appreciated that exhaust gases from the engine 12 flow through the exhaust manifolds 14, exhaust intake pipes 16, catalytic converter 18, and exhaust pipe 20 to atmosphere.

Figure 3:
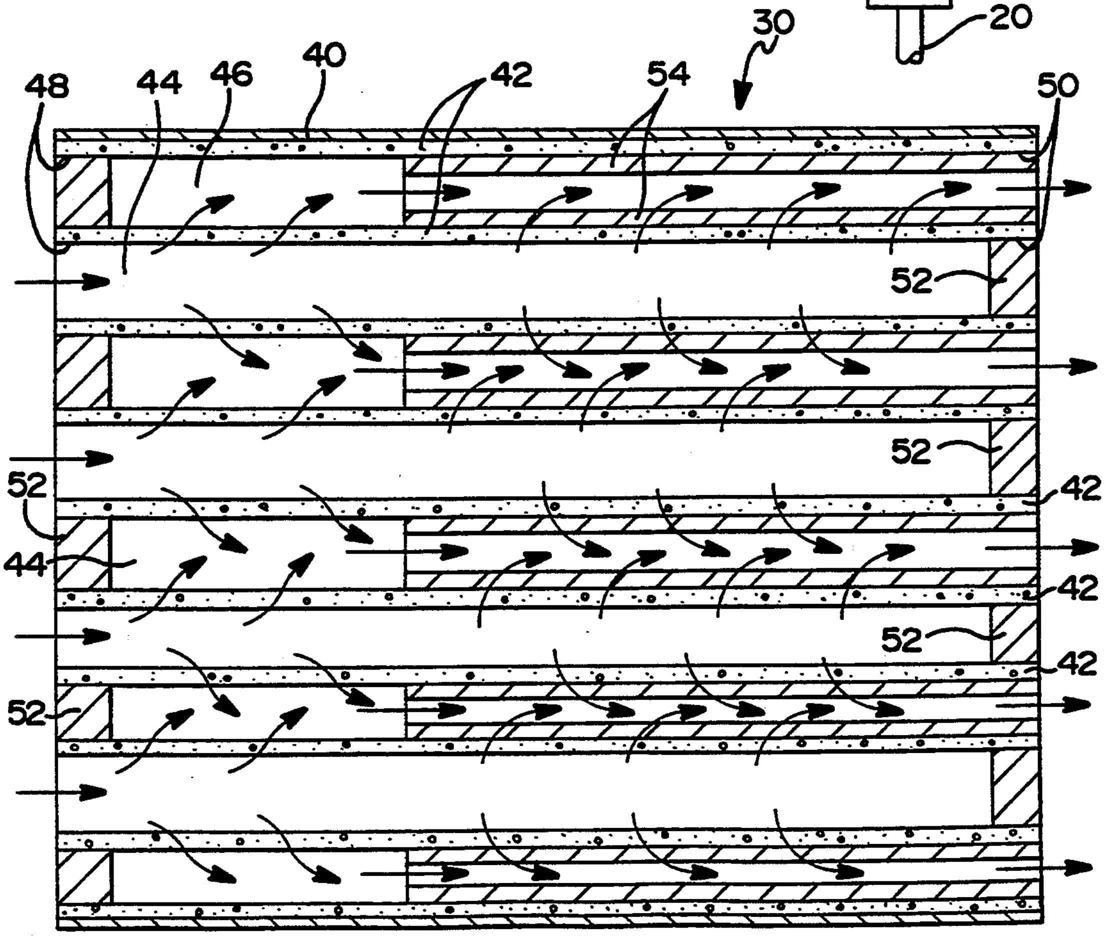
FIG. 3 is an enlarged view of a portion of the exhaust system of FIG. 2.

Referring to FIGS. 2 and 3, the catalytic converter 18 includes a converter housing 22 formed as a tubular member extending longitudinally and having a first or inlet opening 24 at one end and a second or outlet opening 26 at the other end. The catalytic converter 18 also includes a catalyst substrate 28 disposed within the converter housing 22 to convert potentially environmentally harmful exhaust gases into harmless by-products. It should be appreciated that the catalyst substrate 28 is conventional and known in the art.

Referring to FIGS. 1 and 2, the exhaust system 10 further includes an exhaust filter, generally indicated at 30, disposed upstream of the catalytic converter 18. The exhaust filter 30 includes a filter housing 32 formed as a tubular member extending longitudinally and having a first or inlet opening 34 at one end and a second or outlet opening 36 at the other end. The filter housing 32 has an annular flange 38 at the inlet opening 39 disposed about the exhaust intake pipe 16. The filter housing 32 is of a size smaller than the converter housing 22. It should be appreciated that the flange 38 may be secured to the exhaust intake pipe 16 by suitable means such as welding. It should also be appreciated that the converter housing 22 and filter housing 32 may be integral and formed as one piece.

Referring to FIGS. 2 and 3, the exhaust filter 30 includes a filter substrate 40 extending longitudinally. The filter substrate 40 has a plurality of walls 42 extending longitudinally and forming a plurality of alternating first and second channels 44 and 46 extending longitudinally. The walls 42 are made of ceramic material such as ceramic cordierite. The ceramic material is porous and has a maximum pore size of approximately sixty (60) microns. The walls 42 have a thickness of approximately twenty to twenty-five mils. The walls 42 are configured to provide fifty (50) to sixty (60) channels per square inch. The channels 44,46 have a generally rectangular cross-section as illustrated in FIG. 11. It should be appreciated that the cross-sectional area of the channels 44,46 is dictated by flow and filtering requirements.

Each of the channels 44,46 have an inlet end 48 and an outlet end 50. The first channels 44 have a blocking member 52 to close the outlet end 50 and the second channels 46 have a blocking member 52 to close the inlet end 48. The blocking member 52 is made of ceramic material such as ceramic cordierire. The second channels 46 also have a wash coat 54 extending from the outlet end 50 partially along the walls 42 toward the inlet end 48. The wash coat 54 is applied to approximately sixty (60) to sixty-five (65) percent of the length of the walls 42 of the second channels 46. The wash coat 54 restricts the gas flow to approximately fifty percent (50%) of the normal flow (i.e., through the walls 42 that have no wash coat). The wash coat 54 is a catalyst applied by conventional procedures such as dipping the filter substrate 40 in a platinic acid chloride and calcining to achieve twenty-five (25) to fifty (50) (gm/cu ft.) of precious metal loading. Preferably, a three way catalyst of Pd-Rh in approximate ratios of 2:1 to 3:1 is used. It should be appreciated that alternate channels 44,46 are blocked to force all exhaust gas flow to be filtered with the walls 42 having the wash coat 54. It should also be appreciated that the filter substrate 40 traps and burns off heavy HCs encountered during cold start of the engine 12.

Referring to FIGS. 2, 4 and 5, the exhaust system 10 includes a bypass control mechanism, generally indicated at 56, to direct gas flow to and away from the exhaust filter 30. The bypass control mechanism 56 includes a filter flange 58 connected to an inlet end of the exhaust filter 30. The filter flange 58 is a tubular member that extends longitudinally. The filter flange 58 has a plurality of apertures 60 spaced longitudinally and extending radially therethrough for a function to be described. The bypass control mechanism 56 also includes a plate member 62 disposed adjacent the inlet opening 34 and secured to the filter housing 32 by suitable means such as welding. The plate member 62 is generally circular and has a central aperture 64 extending longitudinally therethrough. The central aperture 64 has a diameter less than a diameter of the inlet opening 34.

The bypass control mechanism 56 also includes a control flange 66 disposed about the filter flange 58 and exhaust filter 30. The control flange 66 is a tubular member that extends longitudinally. The control flange 66 has a plurality of apertures 68 spaced longitudinally and extending radially therethrough for a function to be described. It should be appreciated that the apertures 68 of the control flange 66 may be aligned with the apertures 60 of the filter flange 58.

The bypass control mechanism 56 further includes a bellows 70 interconnecting the plate member 62 and one end of the control flange 66. The bellows 70 is made of a temperature sensitive material to provide a passive type of control to move the control flange 66 longitudinally in response to expansion and contraction of the bellows 70. It should be appreciated that the bypass control mechanism 56 may bypass a portion or all of the exhaust gases around the exhaust filter 30.

In operation, upon cold starting of the engine 12, the exhaust system 10 receives exhaust gases from the engine 12. At very low load conditions and very low temperatures, the bellows 70 is in a contracted operational state such that the control flange 66 blocks the apertures 60 of the filter flange 58 (i.e., the apertures 60 and 68 are misaligned) as illustrated in FIG. 4. The exhaust gases flow through the central aperture 64 of the plate member and into the bellows 70 and the filter flange 58. Since the apertures 60 are closed, the exhaust gases are forced to flow into the inlet end 48 of the first channels 44. The exhaust gases flow through the entire exhaust filter 30 and HCs are condensed and adsorbed or stored in the porous walls 42 on the inlet end of the exhaust filter 30.

As the engine 12 warms up, exhaust gas temperature, mass flow and back pressure increase. As a result, the exhaust gases follow the path of least resistance which is through the porous unwashed walls 42 and relatively low flow occurs along the remainder of the first channels 44 as illustrated in FIG. 3.

After a predetermined time period such as sixty (60) to ninety (90) seconds after start of the engine 12, the temperature of the exhaust gases are high enough to cause thermal expansion of the bellows 70. Also, the backpressure of the catalytic converter 18 causes the pressure of the exhaust gases to act on the bellows 70. As a result, the bellows 70 move the control flange 66 longitudinally to align its apertures 68 with the apertures 60 of the filter flange 58. When this occurs, the exhaust gases flow through the apertures 60,68 and bypass the exhaust filter 30 as illustrated in FIG. 5. The heat of the bypassed exhaust gases radiates radially inwardly to increase the temperature of the exhaust filter 30. Because of the insulating characteristics of the exhaust filter 30, the condensed HCs trapped in the pores of the walls 42 are slowly evaporated. As the evaporated HCs pass through the walls 42 of the exhaust filter 30, they provide a very rich A/F ratio which is conducive to $NO_x$ reduction. In spite of the bypass, the gas flows through the outlet end 50 of the second channels 46, and some of the hotter exhaust gases cause $NO_x$ removal and HC and CO to oxidize by the wash coat 54 on the walls 42. This continues until virtually all of the absorbed HCs are oxidized. It should be appreciated that the catalytic converter 18 is of a high enough temperature to oxidize the HCs of the exhaust gases flowing through the catalyst substrate 28. It should also be appreciated that the unreacted portion of the HCs mixes with the bypassed exhaust gases and effectively lowers the A/F ratio and enhances $NO_x$ removal by the catalyst substrate 28.

Alternatively, the exhaust filter 30 may be coated with a lean $NO_x$ catalyst such as Cu, zeolite, or a base metal catalyst such as copper, nickel, cerium, either alone or in combination with their respective oxides. Since this catalyst will not be subjected to high temperatures, the catalyst yields adequate durability.

Referring to FIG. 6, a first alternate embodiment 156 of the bypass control mechanism 56 is shown. Like parts of the bypass control mechanism 56 have like reference numerals increased by one hundred (100). The bypass control mechanism 156 eliminates the bellows 70 and includes an actuator 172 to provide an active type of control. The actuator 172 may be secured to the exhaust intake pipe 16 by suitable means such as fasteners (not shown). The actuator 172 has a rod member 174 connected to the control flange 66 by suitable means such as a bracket 176. The actuator 172 may be of the solenoid type and connected to a source of power (not shown). It should be appreciated that the actuator 172 moves the rod member 174 longitudinally or axially in response to receipt of power.

After a predetermined time period after start of the engine 12, power from an electronic controller (not shown) is sent to the actuator 172. The actuator 172 moves the rod member 174 longitudinally to move the control flange 166 such that the apertures 68 of the control flange 66 move from a misaligned or first operational state as illustrated in FIG. 7 to an aligned or second operational state as illustrated in FIG. 8. It should be appreciated that the operation of the exhaust filter 30 and catalytic converter 18 is similar to that previously described.

Referring to FIG. 9, a second alternate embodiment 256 of the bypass control mechanism 56 is shown. Like parts of the bypass control mechanism 56 have like reference numerals increased by two hundred (200). The bypass control mechanism 256 eliminates the bellows 70 and includes an actuator 272 to provide an active type of control. The actuator 272 may be secured to the filter housing 32 by suitable means such as fasteners (not shown). The actuator 272 has a member (not shown) connected to the control flange 66 by suitable means such as a bracket (not shown). The actuator 272 may be an electronically activated vacuum motor and connected to a source of power (not shown). It should be appreciated that the actuator 272 moves the control flange 66 circumferentially in response to receipt of power.

After a predetermined time period after start of the engine 12, power is sent to the actuator 272. The actuator 272 moves the rod member to move the control flange 66 circumferentially such that the apertures 68 of the control flange 66 move from a misaligned or a first operational state as illustrated in FIG. 9 to an aligned or second operational state as illustrated in FIG. 10. It should be appreciated that the operation of the exhaust filter 30 and catalytic converter 18 is similar to that previously described.

As illustrated in FIG. 1, the exhaust system 10 may include secondary exhaust filters 30' disposed upstream of the primary exhaust filter 30 adjacent the catalytic converter 18. The secondary exhaust filters 30' may be placed under or downstream of the exhaust manifolds 14 and connected thereto. The exhaust intake pipes 16 would be connected to the secondary exhaust filters 30'.

Figure 1B:
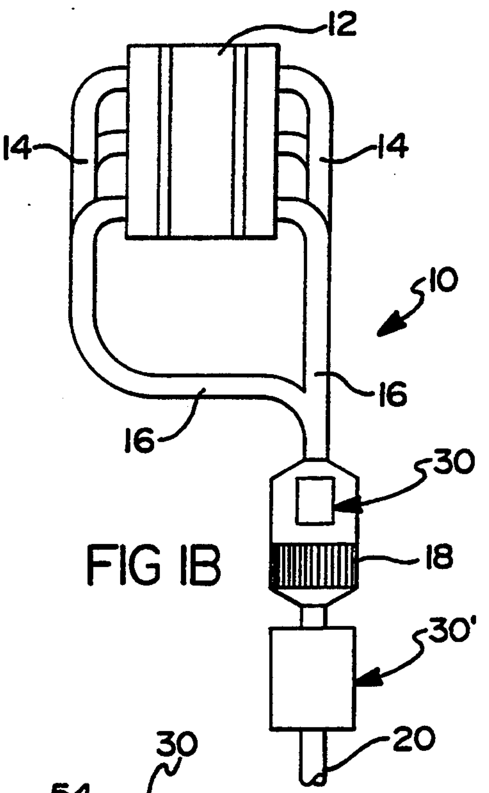
FIG. 1B is a plan view of an alternate embodiment of an exhaust system, according to the present invention, illustrated in operational relationship with a spark ignition internal combustion engine.

As illustrated in FIG. 1B, an alternate embodiment of the exhaust system 10 is shown. The exhaust system 10 may include a secondary exhaust filter 30' disposed downstream of the catalytic converter 18. The intake or frontal area of the secondary exhaust filter 30' is increased sufficiently to reduce backpressure. As a result, the exhaust filters 30,31' act as a powerful silencer to virtually eliminate the need for a muffler.

Figure 12:
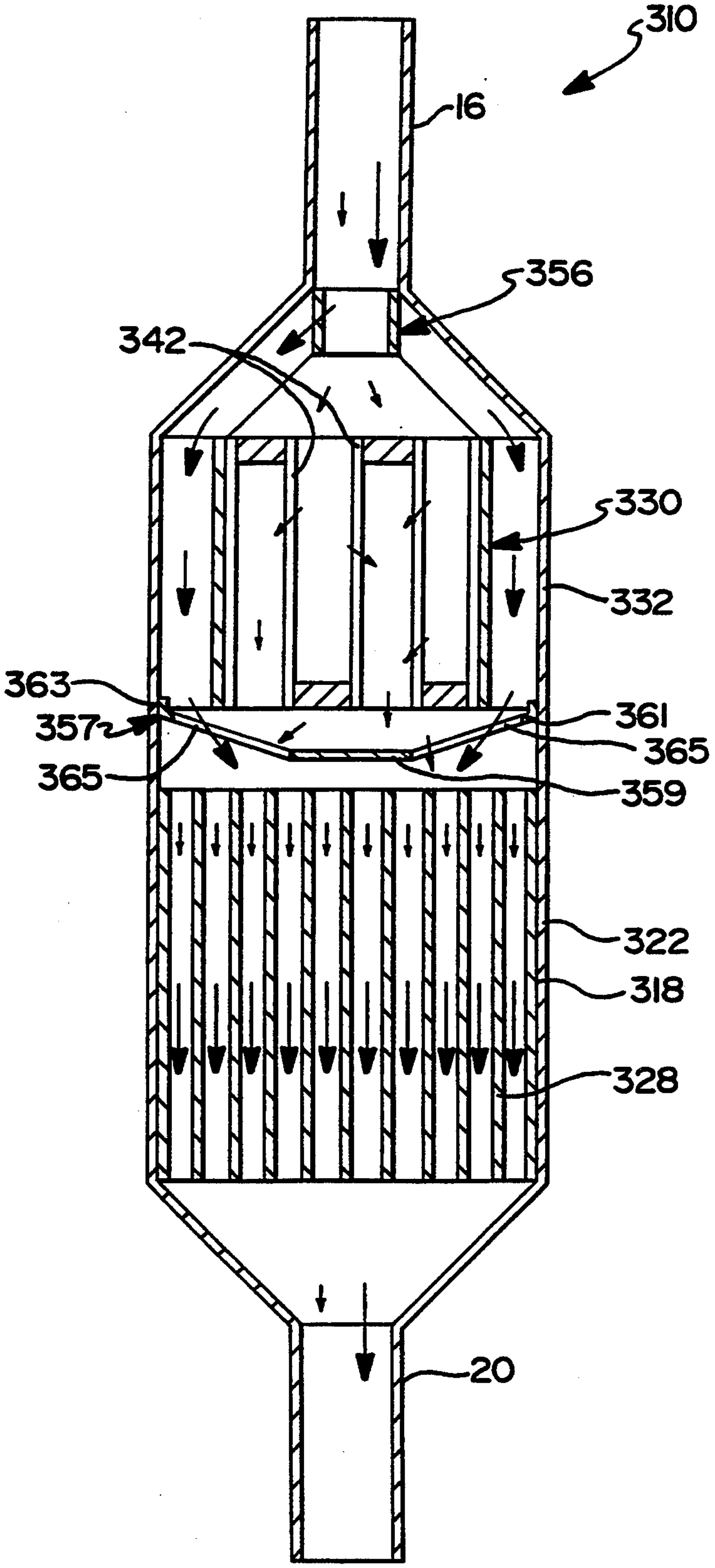
FIG. 12 is a fragmentary view of a second alternate embodiment, according to the present invention, of the exhaust system of FIG. 1.

Referring to FIG. 12, a second alternate embodiment 310 of the exhaust system 10 is shown. Like parts of the exhaust system 10 have like reference numerals increased by three hundred (300). The exhaust system 310 includes an annular flow control baffle, generally indicated at 357, disposed axially between the exhaust filter 330 and catalytic converter 318. The flow control baffle 357 has a central portion 359 extending radially and an inclined portion 361 extending radially and axially away from the central portion 359. The flow control baffle 357 has a flange 363 extending axially from the inclined portion 357 and secured to the housing 332 by suitable means such as welding. The inclined portion 361 has at least one, preferably a plurality of apertures 365 extending axially therethrough to allow gas flow through the flow control baffle 357.

In operation of the exhaust system 310, upon cold starting of the engine 12, exhaust gases from the engine 12 flow through the bypass control mechanism 356 and through the entire exhaust filter 330. When this occurs, HCs are condensed and adsorbed or stored in the porous walls 342 in the inlet end of the exhaust filter 330. As the engine 12 warms up, exhaust gas temperature, mass flow and back pressure increase. After a predetermined time period after start of the engine 12, the bypass control mechanism 356 bypasses either a portion or all of the exhaust gases around the exhaust filter 330. The exhaust gases flow through the apertures 365 in the flow control baffle 357 and through the catalytic converter 318. The heat of the bypassed exhaust gases radiates radially inwardly to increase the temperature of the exhaust filter 330. As this occurs, the condensed HCs are evaporated and gradually released to exit the exhaust filter 330. The released HCs hit the central portion 359 of the flow control baffle 357 and are mixed with the bypassed exhaust gases to flow through the apertures 365 to the catalytic converter 318. When this occurs, the A/F ratio is richer than stoichiometric due to the evaporated HCs from the walls 342 of the exhaust filter 330. It should be appreciated that the catalytic converter 318 oxidizes the HCs and removes $NO_X$ from the exhaust gases flowing through the catalyst substrate 328.

Referring to FIG. 13, a third alternate embodiment 410 of the exhaust system 10 is shown. Like parts of the exhaust system 10 have like reference numerals increased by four hundred (400). The exhaust system 410 may include a pair of secondary exhaust filters 430' disposed downstream of the catalytic converter 418. The secondary exhaust filters 430' are connected to the catalytic converter 418 by suitable means such as a generally Y shaped connecting pipe 17. The secondary exhaust filters 430' have a secondary flow control baffle 457' disposed before the inlet thereof. Also, an air supply (not shown) introduces secondary air into the connecting pipe 17 to mix with the exhaust gases from the catalytic converter 418. The secondary exhaust filters 430' act as a powerful silencer to eliminate the need for a muffler. Optionally, the primary exhaust filter 430 may include a catalyst coated (3-way) porous ceramic wool 467 packed into the channels 444 and 446 thereof to aid in trapping HCs. The operation of the exhaust system 410 is similar to the exhaust system 310.

Referring to FIG. 14, a fourth alternate embodiment 510 of the exhaust system 10 is shown. Like parts of the exhaust system 10 have like reference numerals increased by five hundred (500). The exhaust system 510 may include a pair of secondary catalytic converter 518'. The secondary catalytic converters 518' are connected to the primary catalytic converter 518 by suitable means such as a generally Y shaped connecting pipe 17. The secondary catalytic converters 518' have a secondary flow control baffle 557' disposed before the inlet thereof. Also, an air supply (not shown) introduces secondary air into the connecting pipe 17 to mix with the exhaust gases from the primary catalytic converter 518. The secondary catalytic converters 518' act to provide further oxidation of any HCs and enhances the $NO_X$ removal. Optionally, the exhaust filter 530 may include a catalyst coated (3-way) porous ceramic wool 567 packed into the channels 544 and 546 thereof to aid in trapping HCs. The operation of the exhaust system 510 is similar to the exhaust system 410.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An exhaust system for a spark ignition engine on an automotive vehicle comprising:

filter means disposed downstream of a spark ignition engine for condensing hydrocarbons in exhaust gases from the engine during a first time period after start of the engine;

bypass means for bypassing at least a portion of exhaust gases around said filter means to heat said filter means during a second time period after said first time period and evaporate the condensed hydrocarbons; and a catalytic converter disposed downstream of said filter means to oxidize the evaporated hydrocarbons and reduce $NO_X$ in exhaust gases passing therethrough.

2. An exhaust system as set forth in claim 1 wherein said filter means comprises a housing extending longitudinally and a substrate disposed within said housing having a plurality of walls forming a plurality of channels extending longitudinally with an inlet end and an outlet end.

3. An exhaust system as set forth in claim 2 wherein said substrate includes blocking means for blocking fluid flow alternatingly at said inlet end and said outlet end of said channels.

4. An exhaust system as set forth in claim 3 including a wash coat disposed on said walls of alternating said channels for allowing fluid flow to diffuse through said walls into the other of alternating said channels.

5. An exhaust system as set forth in claim 4 wherein said wash coat extends along said walls from said outlet end to a predetermined distance toward said inlet end.

6. An exhaust system as set forth in claim 5 wherein said wash coat is made of a catalytic material.

7. An exhaust system as set forth in claim 1 wherein said bypass means comprises a filter flange connected to an inlet end of said filter means and having a first plurality of apertures, a control flange disposed about said filter flange and having a second plurality of apertures, and control means for moving said control flange and said filter flange relative to each other for aligning and misaligning said first and second apertures.

8. An exhaust system as set forth in claim 7 wherein said control means comprises a bellows interconnecting said control flange and a housing.

9. An exhaust system as set forth in claim 7 wherein said control means comprises an actuator connected to said control flange for moving said control flange longitudinally relative to said filter flange.

10. An exhaust system as set forth in claim 7 wherein said control means comprises an actuator connected to said control flange for moving said control flange circumferentially relative to said filter flange.

11. A method of reducing hydrocarbons and $NO_x$ in an exhaust system for a spark ignition engine on an automotive vehicle, said method comprising the steps of:

providing a filter downstream of a spark ignition engine and a catalytic converter downstream of the filter for an exhaust system;

condensing hydrocarbons in exhaust gases from the engine on the filter during a first time period after start of the engine;

bypassing at least a portion of exhaust gases around the filter to heat the filter during a second time period after the first time period and evaporate the condensed hydrocarbons; and oxidizing the evaporated hydrocarbons and reducing $NO_x$ in exhaust gases passing through the catalytic converter.

12. A method as set forth in claim 11 including the steps of providing the filter with a plurality of walls forming a plurality of channels extending longitudinally with an inlet end and an outlet end.

13. A method as set forth in claim 12 including the step of blocking fluid flow alternatingly at the inlet end and outlet end of the channels.

14. A method as set forth in claim 13 including the step of disposing a wash coat on the walls of alternating channels and allowing fluid flow to diffuse through the walls into the other of alternating channels.

15. A method as set forth in claim 14 including the step of extending the wash coat along the walls from the outlet end to a predetermined distance toward the inlet end.

16. A method as set forth in claim 15 wherein the wash coat is made of a catalytic material.

17. A method as set forth in claim 11 including the step of connecting a filter flange to an inlet end of the filter having a first plurality of apertures, disposing a control flange about the filter flange having a second plurality of apertures, and moving the control flange and the filter flange relative to each other for aligning and misaligning the first and second apertures.

18. A method as set forth in claim 17 including the step of connecting a bellows between the control flange and a housing of the filter and moving the control flange longitudinally relative to the filter flange.

19. A method as set forth in claim 17 including the step of connecting an actuator to the control flange and moving the control flange longitudinally relative to the filter flange.

20. A method as set forth in claim 17 including the step of connecting an actuator to the control flange and moving the control flange circumferentially relative to the filter flange.

* * * * *